United States Patent
Bai

(10) Patent No.: US 10,574,285 B2
(45) Date of Patent: *Feb. 25, 2020

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,787

(22) Filed: Nov. 6, 2018

(65) Prior Publication Data

US 2019/0288728 A1 Sep. 19, 2019

(30) Foreign Application Priority Data

Mar. 16, 2018 (CN) .......................... 2018 1 0220930

(51) Int. Cl.
H04B 1/40 (2015.01)
H04B 1/00 (2006.01)
(Continued)

(52) U.S. Cl.
CPC ............... *H04B 1/40* (2013.01); *H04B 1/005* (2013.01); *H04B 1/44* (2013.01); *H04B 7/0404* (2013.01);
(Continued)

(58) Field of Classification Search
CPC ........ H04B 1/40; H04B 1/005; H04B 7/0404; H04B 7/0686; H01Q 7/00; H04W 88/06
(Continued)

(56) References Cited

U.S. PATENT DOCUMENTS 6,229,486 B1  5/2001 Krile
7,633,357 B2  12/2009 Hangai et al.
(Continued)

FOREIGN PATENT DOCUMENTS

CN  101154978 A  4/2008
CN  101242213 A  8/2008
(Continued)

OTHER PUBLICATIONS

Gao Xiang et al: "Multi-Switch for Antenna Selection in Massive MIMO", 2015 IEEE Global Communications Conference (GLOBECOM), IEEE, Dec. 6, 2015 (Dec. 6, 2015), pp. 1-6, XP032872922, DOI: 10.1109/GLOCOM.2014.7417765 [retrieved on Feb. 23, 2016] abstract; Sections I, III.B, III.C; figures 1,2,5,6.
(Continued)

*Primary Examiner* — Wednel Cadeau
(74) *Attorney, Agent, or Firm* — Young Basile Hanlon & MacFarlane, P.C.

(57) ABSTRACT

A multiway switch, a radio frequency system, and a wireless communication device are provided. The multiway switch includes four T ports and $2^n$ P ports. Each of the four T ports is coupled with all of the $2^n$ P ports. The four T ports support a transmission-reception function. n is an integer and n≥2. The multiway switch is configured to be coupled with a radio frequency circuit and an antenna system of a wireless communication device operable in a dual-frequency dual-transmit mode, to implement a preset function of the wireless communication device. The antenna system includes $2^n$ antennas corresponding to the $2^n$ P ports, and the preset function is a function of transmitting a sounding reference signal (SRS) through the $2^n$ antennas in turn.

20 Claims, 10 Drawing Sheets

(51) Int. Cl.
  *H04B 7/0404* (2017.01)
  *H04B 7/06* (2006.01)
  *H01Q 7/00* (2006.01)
  *H04W 88/06* (2009.01)
  *H04B 1/44* (2006.01)

(52) U.S. Cl.
  CPC ............ *H04B 7/0686* (2013.01); *H01Q 7/00* (2013.01); *H04W 88/06* (2013.01)

(58) Field of Classification Search
  USPC ........................................................ 375/267
  See application file for complete search history.

(56) References Cited

U.S. PATENT DOCUMENTS

| | | | |
|---|---|---|---|
| 9,831,940 | B2 | 11/2017 | Patel et al. |
| 9,960,791 | B2 | 5/2018 | Desclos et al. |
| 10,075,199 | B2 | 9/2018 | King et al. |
| 2005/0036505 | A1 | 2/2005 | Frei et al. |
| 2009/0054093 | A1 | 2/2009 | Kim et al. |
| 2013/0308554 | A1* | 11/2013 | Ngai .................... H04B 7/0404 370/329 |
| 2014/0211873 | A1 | 7/2014 | Park et al. |
| 2014/0227982 | A1* | 8/2014 | Granger-Jones ..... H04B 7/0404 455/77 |
| 2015/0171914 | A1 | 6/2015 | Desclos et al. |
| 2015/0340769 | A1 | 11/2015 | Desclos et al. |
| 2017/0149134 | A1 | 5/2017 | Klemes |
| 2017/0155444 | A1 | 6/2017 | Patel et al. |
| 2017/0164226 | A1 | 6/2017 | Wei et al. |
| 2017/0195004 | A1 | 7/2017 | Cheng et al. |
| 2017/0373368 | A1 | 12/2017 | Srirattana et al. |
| 2018/0026379 | A1 | 1/2018 | Barker et al. |
| 2018/0152955 | A1 | 5/2018 | Park et al. |
| 2018/0205413 | A1 | 7/2018 | Patel et al. |

FOREIGN PATENT DOCUMENTS

| | | |
|---|---|---|
| CN | 101867402 A | 10/2010 |
| CN | 103905104 A | 7/2014 |
| CN | 105245295 A | 1/2016 |
| CN | 105281735 A | 1/2016 |
| CN | 105634569 A | 6/2016 |
| CN | 105703053 A | 6/2016 |
| CN | 106559277 A | 4/2017 |
| CN | 106685621 A | 5/2017 |
| CN | 106788577 A | 5/2017 |
| CN | 108199727 A | 6/2018 |
| CN | 108390693 A | 8/2018 |
| CN | 108462497 A | 8/2018 |
| CN | 108462506 A | 8/2018 |
| CN | 108462507 A | 8/2018 |
| CN | 108494413 A | 9/2018 |
| CN | 108494461 A | 9/2018 |
| CN | 108512556 A | 9/2018 |
| CN | 108599777 A | 9/2018 |
| EP | 2485555 A1 | 8/2012 |
| WO | 2012026601 A1 | 3/2012 |
| WO | 2012109988 A1 | 8/2012 |
| WO | 2015131020 A1 | 9/2015 |

OTHER PUBLICATIONS

Lemieux G et al: "Generating Highly-Routable Sparse Crossbars for PLDS", FPGA'OO. ACM/SIGDA International Symposium on Field Programmable Gate Arrays. Monterey, CA, Feb. 9-11, 20; [ACM/SIGDAInternational Symposium on Field Programmable Gate Arrays], New York, NY: ACM, US, vol. Conf. 8, Jan. 1, 2000 (Jan. 1, 2000), pp. 155-164, XP008060160, DOI: 10.1145/329166. 329199 ISBN: 978-1-58113-193-2 Section 2; figure 1.

Extended European search report issued in corresponding European application No. 18204505.4 dated May. 28, 2019.

International search report issued in corresponding international application No. PCT/CN2018/112763 dated Jan. 30, 2019.

International search report issued in corresponding international application No. PCT/CN2018/111028 dated Jan. 3, 2019.

International search report issued in corresponding international application No. PCT/CN2018/114406 dated Jan. 30, 2019.

* cited by examiner

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220930.6, filed on Mar. 16, 2018, the disclosure of which is hereby incorporated by reference in its entirety.

TECHNICAL FIELD

This disclosure relates to the field of mobile terminal technology, and particularly to a multiway switch, a radio frequency system, and a wireless communication device.

BACKGROUND

With the widespread use of wireless communication devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the wireless communication device generally adopts a single-antenna or dual-antenna radio frequency (RF) system architecture. Currently, in a new radio (NR) system of the fifth generation (5G) mobile communication system, requirements on supporting a four-antenna RF system architecture are proposed.

SUMMARY

Implementations of the disclosure provide a multiway switch, a radio frequency system, and a wireless communication device, to implement a function of transmitting a sounding reference signal (SRS) through $2^n$ antennas corresponding to $2^n$ ports in turn (that is, $2^n$-port SRS) of a wireless communication device in the fifth generation new radio (5G NR).

According to a first aspect of implementations of the disclosure, a multiway switch is provided. The multiway switch includes four T ports and $2^n$ P ports. Each of the four T ports is coupled with all of the $2^n$ P ports. n is an integer and n≥2. The four T ports support a transmission-reception function.

The multiway switch is configured to be coupled with a radio frequency circuit and an antenna system of a wireless communication device operable in a dual-frequency dual-transmit mode, to implement a preset function of the wireless communication device. The antenna system includes $2^n$ antennas corresponding to the $2^n$ P ports. The preset function is a function of transmitting a sounding reference signal (SRS) through the $2^n$ antennas in turn.

According to a second aspect of implementations of the disclosure, a radio frequency system is provided. The radio frequency system includes an antenna system, a radio frequency circuit, and a multiway switch coupled with the radio frequency circuit and the antenna system.

The multiway switch includes four T ports and $2^n$ P ports. Each of the four T ports is coupled with all of the $2^n$ P ports. The four T ports support a transmission-reception function. n is an integer and n≥2. The antenna system includes $2^n$ antennas corresponding to the $2^n$ P ports. The multiway switch is configured to implement a preset function of transmitting an SRS through the $2^n$ antennas in turn.

According to a third aspect of implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes four T ports and $2^n$ P ports. The antenna system includes $2^n$ antennas corresponding to the $2^n$ P ports. n is an integer and n≥2. Each of the four T ports is coupled with all of the $2^n$ P ports and the four T ports support a transmission-reception function. Each P port is coupled with one antenna of the $2^n$ antennas and any two P ports of the $2^n$ P ports are coupled with different antennas of the $2^n$ antennas. The multiway switch is configured to support a preset function of transmitting an SRS through the $2^n$ antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

To facilitate description, in the above figures, Nx indicates one frequency band and Ny indicates another frequency band.

DETAILED DESCRIPTION

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "embodiment" or "implementation" referred to herein means that a particular feature, structure, or characteristic described in conjunction with the implementations may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The implementations of the present disclosure are described briefly below.

Figure 1A:
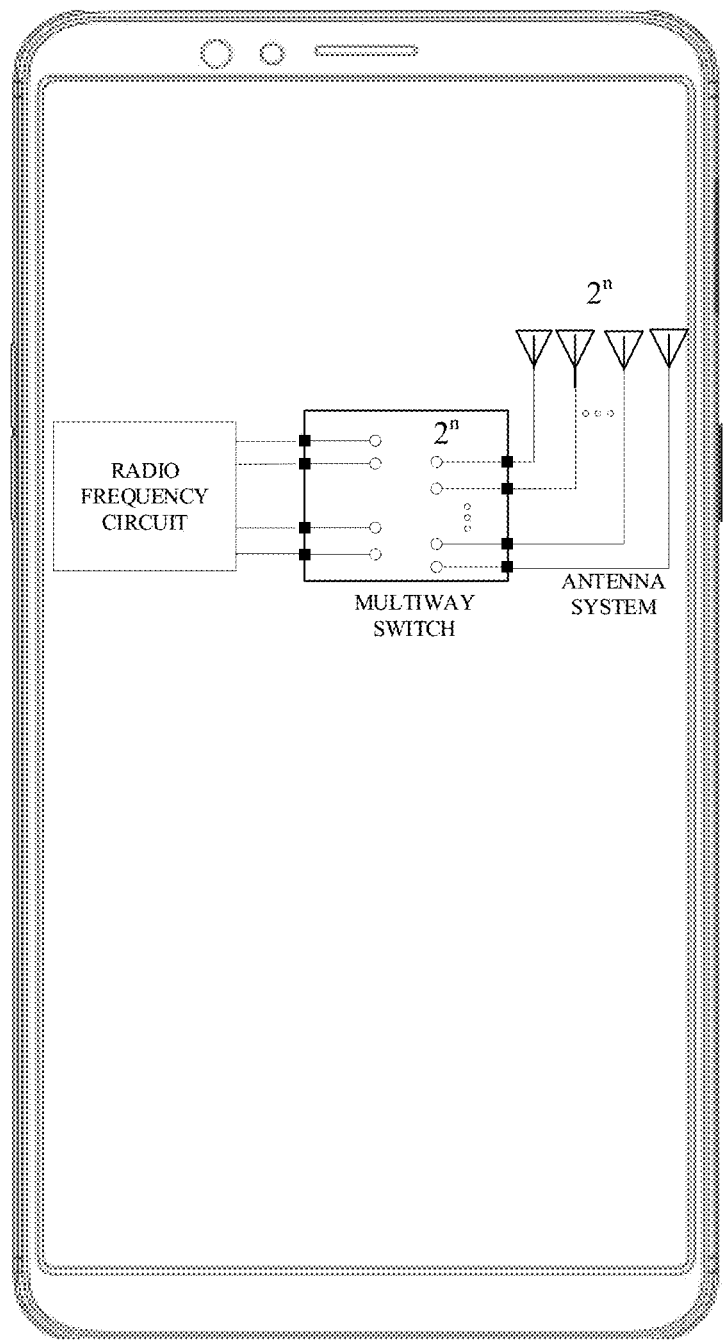
FIG. 1A is a schematic structural diagram illustrating a multiway switch according to an implementation of the disclosure.

According to the implementations of the disclosure, a multiway switch is provided. As illustrated in FIG. 1A, the multiway switch includes four T ports and $2^n$ P ports. Each of the four T ports is coupled with all of the $2^n$ P ports. The four T ports support a transmission-reception function. n is an integer and n≥2. The multiway switch is applicable to a wireless communication device. The wireless communication device is operable in a dual-frequency dual-transmit mode and includes an antenna system and a radio frequency circuit.

The multiway switch is configured to be coupled with the radio frequency circuit and the antenna system of the wireless communication device to implement a preset function of the wireless communication device. The antenna system includes $2^n$ antennas corresponding to the $2^n$ P ports.

The preset function is a function of transmitting a sounding reference signal (SRS) through the $2^n$ antennas in turn.

As one implementation, the radio frequency circuit logically includes four transceiver integrated circuits and ($2^{n+1}$−4) receiver circuits. The radio frequency circuit physically includes m independent circuit modules, where m is an integer and m≥2. The m independent circuit modules have transmit-receive ports configured to be coupled in one-to-one correspondence with the four T ports. Each P port of the $2^n$ P ports is configured to be coupled with a corresponding antenna of the $2^n$ antennas.

As one implementation, n=2, and the radio frequency circuit logically includes four transceiver integrated circuits (can be comprehended as an integrated circuit for transmitting, receiving, and/or processing signals) and four receiver circuits (can be comprehended as a circuit for receiving and/or processing signals).

m=2, and the radio frequency circuit physically includes two independent circuit modules.

The two independent circuit modules have transmit-receive ports configured to be coupled in one-to-one correspondence with the four T ports.

As one implementation, the two independent circuit modules include two first independent circuit modules, the first independent circuit module includes two transmit-receive ports, and the transmit-receive ports are configured to be coupled with the T ports.

The first independent circuit module includes two transceiver integrated circuits working at different frequency bands, two receiver circuits, two power couplers, and two first selector switches.

Each transceiver integrated circuit includes a first power amplifier (PA), a first filter, a second selector switch, and a first low-noise amplifier (LNA). The second selector switch has a common port coupled with one port of the first filter. The first filter has the other port coupled with one port on one side of the power coupler. The second selector switch has one selection port coupled with the first PA and the other selection port coupled with the first LNA.

Each receiver circuit includes a second LNA and a second filter. The second filter has one port coupled with an input port of the second LNA. The second filter has the other port coupled with the other port on the one side of the power coupler. The second LNA has an output port configured to output receive signals.

The power coupler has two ports on the other side coupled in one-to-one correspondence with two selection ports of the first selector switch, and the first selector switch has a common port configured to be coupled with the T port.

As one implementation, n=2, and the radio frequency circuit logically includes four transceiver integrated circuits and four receiver circuits.

m=3, and the radio frequency circuit physically includes three independent circuit modules. The three independent circuit modules include two first independent circuit modules and one second independent circuit module.

The three independent circuit modules have transmit-receive ports configured to be coupled in one-to-one correspondence with the four T ports.

As one implementation, the first independent circuit module includes one transceiver integrated circuit, one receiver circuit, one power coupler, and one first selector switch.

The second independent circuit module includes two transceiver integrated circuits working at different frequency bands, two receiver circuits, two power couplers, and two first selector switches.

Each transceiver integrated circuit includes a first PA, a first filter, a second selector switch, and a first LNA. The second selector switch has a common port coupled with one port of the first filter. The first filter has the other port coupled with one port on one side of the power coupler. The second selector switch has one selection port coupled with the first PA and the other selection port coupled with the first LNA.

Each receiver circuit includes a second LNA and a second filter. The second filter has one port coupled with an input port of the second LNA. The second filter has the other port coupled with the other port on the one side of the power coupler. The second LNA has an output port configured to output receive signals.

The power coupler has two ports on the other side coupled in one-to-one correspondence with two selection ports of the first selector switch, and the first selector switch has a common port configured to be coupled with the T port.

As one implementation, n=2, and the radio frequency circuit includes four transceiver integrated circuits and four receiver circuits.

m=4, and the radio frequency circuit physically includes four independent circuit modules. The four independent circuit modules include four first independent circuit modules.

The four independent circuit modules have transmit-receive ports configured to be coupled in one-to-one correspondence with the four T ports.

As one implementation, the first independent circuit module includes one transceiver integrated circuit, one receiver circuit, one power coupler, and one first selector switch.

Each transceiver integrated circuit includes a first PA, a first filter, a second selector switch, and a first LNA. The second selector switch has a common port coupled with one port of the first filter. The first filter has the other port coupled with one port on one side of the power coupler. The second selector switch has one selection port coupled with the first PA and the other selection port coupled with the first LNA.

Each receiver circuit includes a second LNA and a second filter. The second filter has one port coupled with an input port of the second LNA. The second filter has the other port coupled with the other port on the one side of the power coupler. The second LNA has an output port configured to output receive signals.

The power coupler has two ports on the other side coupled in one-to-one correspondence with two selection ports of the first selector switch and the first selector switch has a common port configured to be coupled with the T port.

As one implementation, the multiway switch includes field-effect transistors (FET), and 56 FETs are configured in the multiway switch.

As one implementation, n=2, and the $2^n$ antennas include a first antenna, a second antenna, a third antenna, and a fourth antenna. The first antenna, the second antenna, the third antenna, and the fourth antenna are antennas operable at a 5G NR frequency band.

As one implementation, n=2, and the $2^n$ antennas include a first antenna, a second antenna, a third antenna, and a fourth antenna. The first antenna and the fourth antenna are antennas operable at a long term evolution (LTE) frequency band and a 5G NR frequency band. The second antenna and the third antenna are antennas only operable at the 5G NR frequency band.

As one implementation, the antenna system further includes a first combiner and a second combiner. The first combiner has a first port configured to be coupled with the first antenna, a second port configured to be coupled with a first receive path in LTE 4×4 multiple-input multiple-output (MIMO) configuration of the wireless communication device, and a third port configured to be coupled with a corresponding P port of the multiway switch. The second combiner has a first port configured to be coupled with the fourth antenna, a second port configured to be coupled with a second receive path in the LTE 4×4 MIMO configuration of the wireless communication device, and a third port configured to be coupled with a corresponding P port of the multiway switch.

As one implementation, the antenna system further includes a first single-pole double-throw (SPDT) switch and a second SPDT switch. The first SPDT switch has a first port configured to be coupled with the first antenna, a second port configured to be coupled with a first receive path in LTE 4×4 MIMO configuration of the wireless communication device, and a third port configured to be coupled with a corresponding P port of the multiway switch. The second SPDT switch has a first port configured to be coupled with the fourth antenna, a second port configured to be coupled with a second receive path in the LTE 4×4 MIMO configuration of the wireless communication device, and a third port configured to be coupled with a corresponding P port of the multiway switch.

According to the implementations of the disclosure, a radio frequency system is provided. The radio frequency system includes an antenna system, a radio frequency circuit, and a multiway switch coupled with the radio frequency circuit and the antenna system.

The multiway switch includes four T ports and $2^n$ P ports. Each of the four T ports is coupled with all of the $2^n$ P ports. The four T ports support a transmission-reception function. n is an integer and n≥2. The antenna system includes $2^n$ antennas corresponding to the $2^n$ P ports. The multiway switch is configured to implement a preset function of transmitting an SRS through the $2^n$ antennas in turn.

According to the implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes four T ports and $2^n$ P ports. The antenna system includes $2^n$ antennas corresponding to the $2^n$ P ports. n is an integer and n≥2. Each of the four T ports is coupled with all of the $2^n$ P ports and the four T ports support a transmission-reception function. Each P port is coupled with one antenna of the $2^n$ antennas and any two P ports of the $2^n$ P ports are coupled with different antennas of the $2^n$ antennas. The multiway switch is configured to support a preset function of transmitting an SRS through the $2^n$ antennas in turn.

The following describes some terms of the disclosure to facilitate understanding of those skilled in the art.

"P port" in the disclosure is the abbreviation of "pole port", which refers to ports coupled with antennas of the multiway switch. "T port" in the disclosure is the abbreviation of "throw port", which refers to ports coupled with radio frequency modules of the multiway switch. The multiway switch is a 4P4T switch for example. "Module" herein can refer to circuits and any combination of related components. "Dual-frequency dual-transmit mode" refers to an operating mode in which the wireless communication device can support at most dual frequency band-two UL transmit paths or dual frequency band-four DL receive paths.

The concept of "coupling", "full-coupling", or other kinds of coupling between the T ports and the P ports of the multiway switch described in the implementations of the disclosure refers to a state in which the T ports are coupled with the P ports through switch transistors. In addition, the wireless communication device can control paths between the T ports and the P ports to switch on through the switch transistors. The transmitting an SRS through the four antennas corresponding to the four P ports in turn refers to a process in which the wireless communication device interacts with a base station based on polling mechanism to determine quality of an uplink channel corresponding to each antenna.

The wireless communication device involved in the implementations of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like. In another practical application scenario, the foregoing wireless communication device may also be a device at the network side, such as a base station, an access point, and the like. For the convenience of description, the above-mentioned devices are collectively referred to as a wireless communication device.

At present, SRS switching in four antennas of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring uplink signals of the four antennas of the mobile phone, to perform a beamforming of a downlink massive MIMO antenna array on the four channels according to a channel reciprocity, and finally to obtain the best data transmission performance for a downlink 4×4 MIMO.

In order to satisfy requirements of SRS switching in four antennas, implementations of the present disclosure provide a radio frequency architecture based on a simplified 4P4T antenna switch. Compared with a 3P3T/DPDT/multiway small switch switching scheme, the present switching scheme can reduce the number of series switches in each path (all or part of switches are integrated into the 4P4T switch), thereby reducing link loss and optimizing the overall transmission and reception performance of the terminal.

The implementations of the present disclosure are described in detail below.

The following describes the case where n=2, that is, four antennas and four P ports are configured, as an example. It is to be noted that, the number of the antennas and the P ports are not limited to 4, and the number thereof can be extended to $2^n$ (n being an integer and n≥2) in the implementations of the disclosure. In the case where $2^n$ antennas and $2^n$ P ports are configured, with regard to logical composition of the radio frequency circuit, physical composition of the radio frequency circuit, coupling between the independent circuit modules and the T ports, coupling between the T ports and the P ports, coupling between the P ports and the antennas, and the like, reference may be made in the following implementations. As for the principle of achieving the transmitting an SRS through the $2^n$ antennas in turn and the structure of simplified switch, reference may further be made to related descriptions in the following implementations.

Figure 1B:
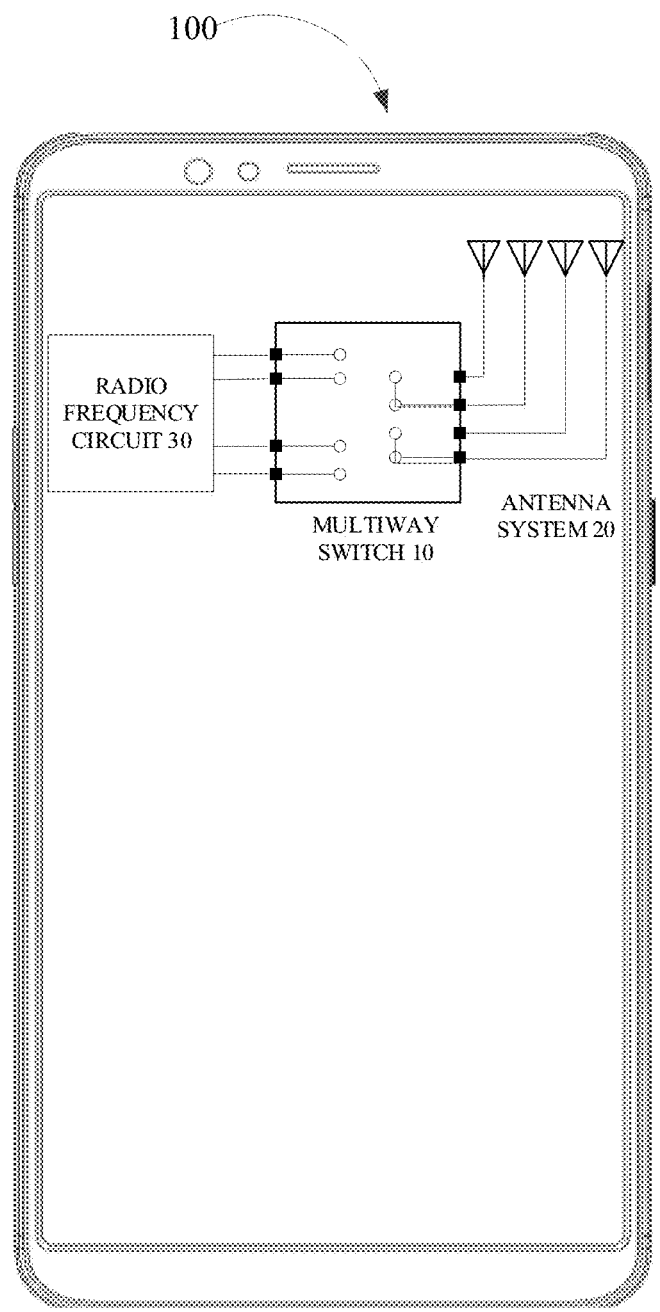
FIG. 1B is a schematic structural diagram illustrating a multiway switch according to an implementation of the disclosure.

FIG. 1B is a schematic structural diagram illustrating a multiway switch 10 according to an implementation of the disclosure. The multiway switch 10 includes four T ports and four P ports. Each of the four T ports is coupled with all of the four P ports (that is, fully-coupled). The four T ports support a transmission-reception function. The multiway switch 10 is applicable to a wireless communication device 100. The wireless communication device 100 is operable in a dual-frequency dual-transmit mode and includes an antenna system 20 and a radio frequency circuit 30. The antenna system 20 includes four antennas. The four antennas correspond to the four P ports; specifically, the four antennas and the four P ports are in one-to-one correspondence. One antenna is coupled with a corresponding P port.

The multiway switch 10 is configured to be coupled with the radio frequency circuit 30 and the antenna system 20 to implement a preset function of the wireless communication device 100. The preset function is a function of transmitting an SRS through the four antennas corresponding to the four P ports in turn, which can be understood as a four-port SRS function.

The wireless communication device may be a mobile phone or other terminal devices supporting the 5G NR, such as a customer premise equipment (CPE) or a mobile wireless-fidelity (MIFI).

The following will describe the case where the four T ports are fully coupled with the four P ports in detail.

Figure 2:
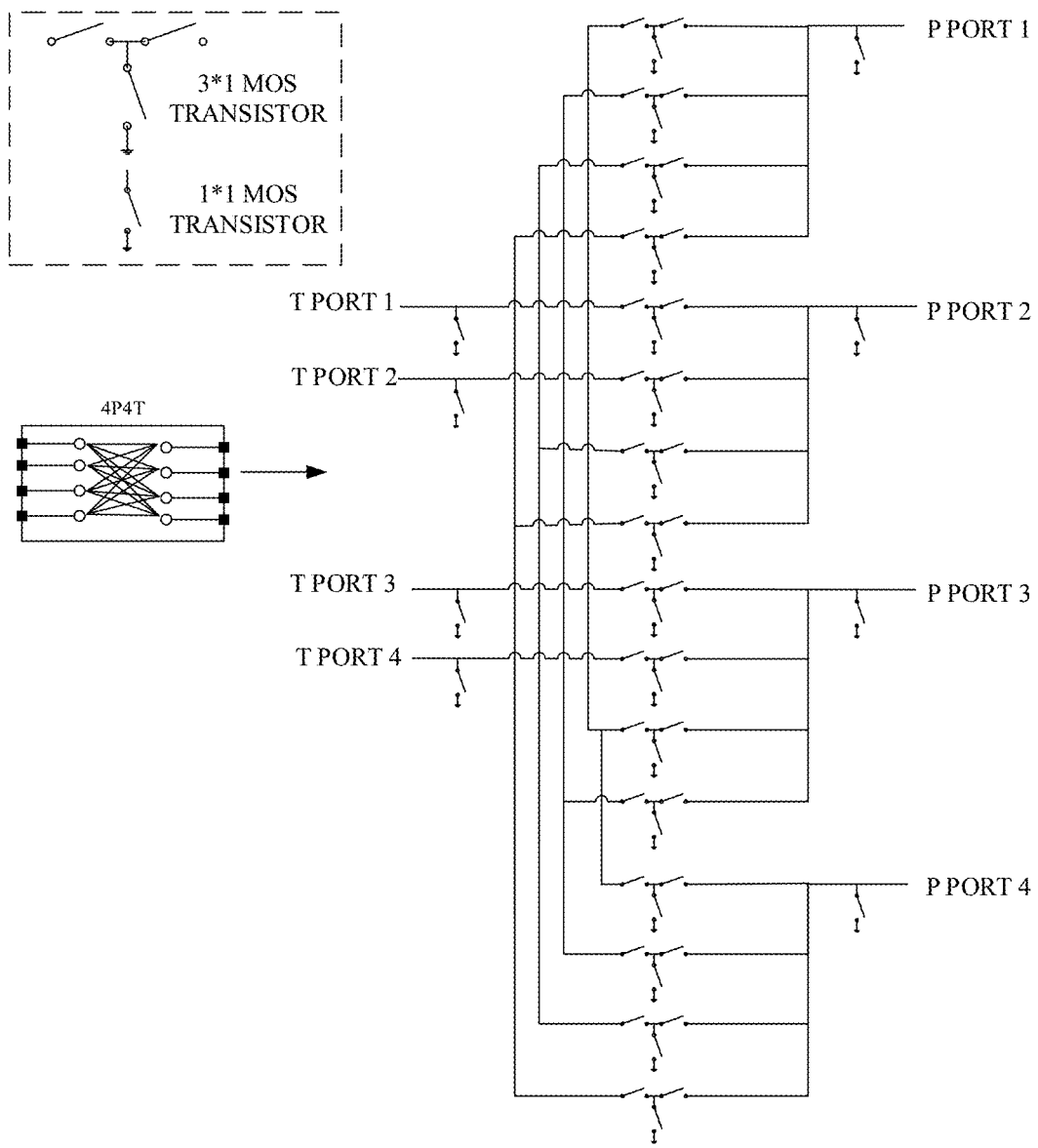
FIG. 2 is a schematic structural diagram illustrating a fully coupled 4P4T switch according to an implementation of the disclosure.

In the case where the multiway switch includes four T ports and field-effect transistors (FET), if each of the four T ports is fully coupled with the four P ports, as illustrated in FIG. 2 of a schematic structural diagram of the multiway switch, the number of the FETs of the multiway switch is 4+4*4*3+4=56.

In addition, the wireless communication device further includes a radio frequency transceiver. The radio frequency transceiver is coupled with the radio frequency circuit and constitutes a radio frequency system of the wireless communication device together with the radio frequency circuit, the multiway switch, and the antenna system.

According to the implementations of the disclosure, the wireless communication device includes the antenna system, the radio frequency circuit, and the multiway switch. The antenna system includes the four antennas. The multiway switch includes the four T ports and the four P ports. The multiway switch is configured to be coupled with the radio frequency circuit and the antenna system to implement the preset function of the wireless communication device, and the preset function is a function of transmitting an SRS through the four antennas corresponding to the four P ports in turn.

Figure 3:
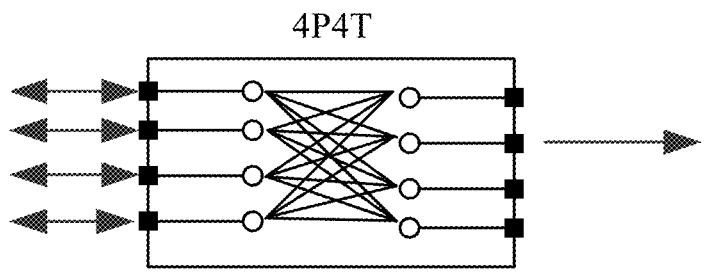
FIG. 3 is a schematic structural diagram illustrating ports of a fully coupled 4P4T switch according to an implementation of the disclosure.

For four T ports, as illustrated in FIG. 3, in one possible implementation, the four T ports can be ports supporting the transmission-reception function (indicated with double-headed arrows) and ports fully coupled with the four P ports.

The radio frequency circuit adapted to the four T ports of the multiway switch can include four transceiver integrated circuits and four receiver circuits.

Figure 4A:
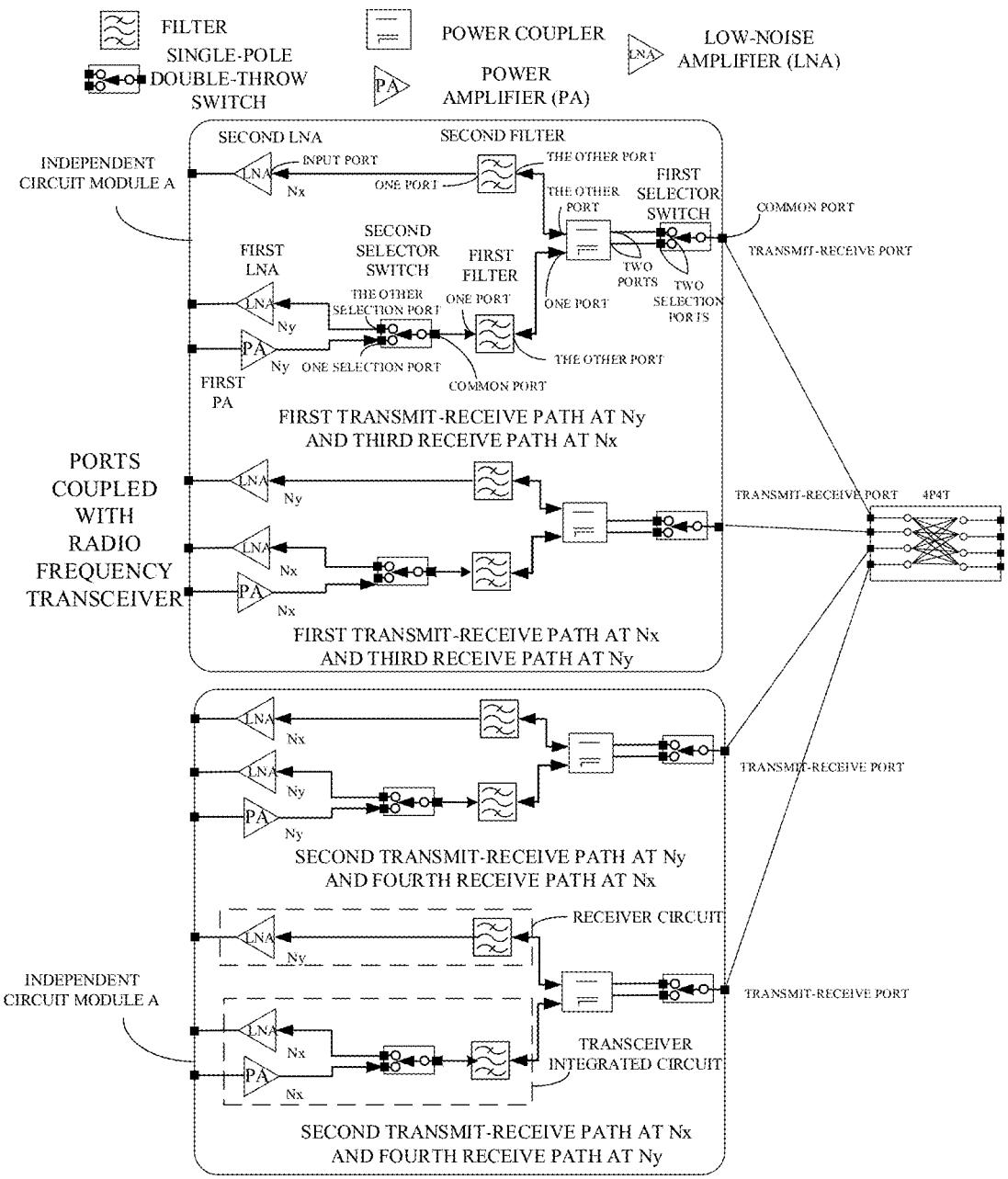
FIG. 4A is a schematic structural diagram illustrating two independent circuit modules corresponding to a fully coupled 4P4T switch according to an implementation of the disclosure.

As illustrated in FIG. 4A, the radio frequency circuit physically includes two independent circuit modules. The two independent circuit modules have transmit-receive ports coupled in one-to-one correspondence with the four T ports.

The two independent circuit modules can include two first independent circuit modules, where the first independent circuit module is embodied as an independent circuit module A.

The independent circuit module A includes two transceiver integrated circuits working at different frequency bands, two receiver circuits, two power couplers, and two first selector switches. The two transceiver integrated circuits are structured to work at different frequency bands, so as to avoid interference of the same frequency band and influence on quality of transmit signals.

Each transceiver integrated circuit includes a first PA, a first filter, a second selector switch, and a first LNA. The second selector switch has a common port coupled with one port of the first filter. The first filter has the other port coupled with one port on one side of the power coupler. The second selector switch has one selection port coupled with the first PA and the other selection port coupled with the first LNA.

Each receiver circuit includes a second LNA and a second filter. The second filter has one port coupled with an input port of the second LNA. The second filter has the other port coupled with the other port on the foregoing one side of the power coupler. The second LNA has an output port configured to output receive signals.

The power coupler has two ports on the other side coupled in one-to-one correspondence with two selection ports of the first selector switch and the first selector switch has a common port coupled with the T port.

Figure 4B:
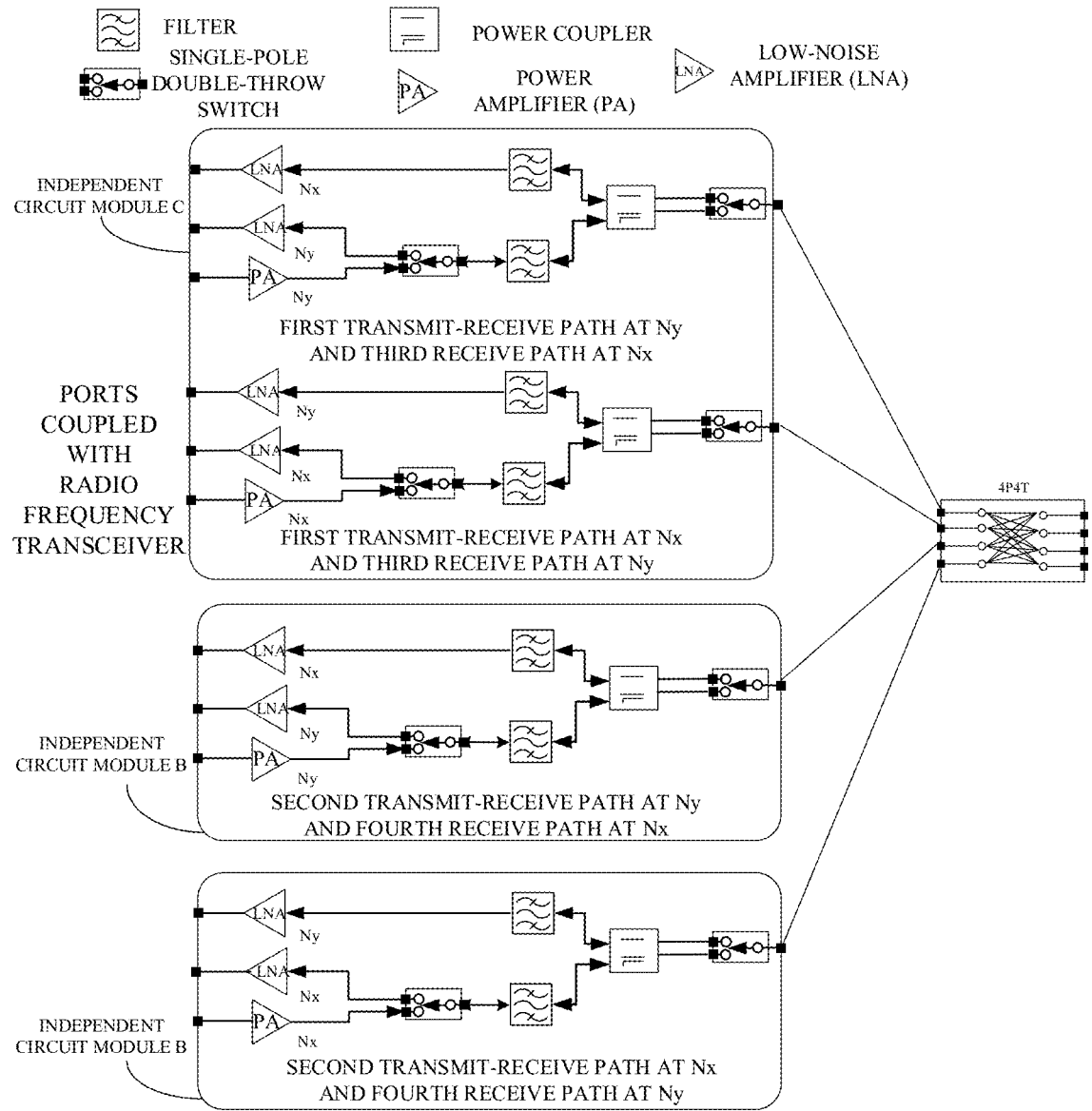
FIG. 4B is a schematic structural diagram illustrating three independent circuit modules corresponding to a fully coupled 4P4T switch according to an implementation of the disclosure.

As illustrated in FIG. 4B, the radio frequency circuit physically includes three independent circuit modules. The three independent circuit modules include two first independent circuit modules and one second independent circuit module. In this implementation, the first independent circuit module is embodied as an independent circuit module B and the second independent circuit module is embodied as an independent circuit module C.

The three independent circuit modules have transmit-receive ports coupled in one-to-one correspondence with the four T ports.

The independent circuit module B can include one transceiver integrated circuit, one receiver circuit, one power coupler, and one first selector switch.

The independent circuit module C can include two transceiver integrated circuits working at different frequency bands, two receiver circuits, two power couplers, and two first selector switches.

Each transceiver integrated circuit includes a first PA, a first filter, a second selector switch, and a first LNA. The second selector switch has a common port coupled with one port of the first filter. The first filter has the other port coupled with one port on one side of the power coupler. The second selector switch has one selection port coupled with the first PA and the other selection port coupled with the first LNA.

Each receiver circuit includes a second LNA and a second filter. The second filter has one port coupled with an input port of the second LNA. The second filter has the other port coupled with the other port on the foregoing one side of the power coupler. The second LNA has an output port configured to output receive signals.

The power coupler has two ports on the other side coupled in one-to-one correspondence with two selection ports of the first selector switch and the first selector switch has a common port coupled with the T port.

Figure 4C:
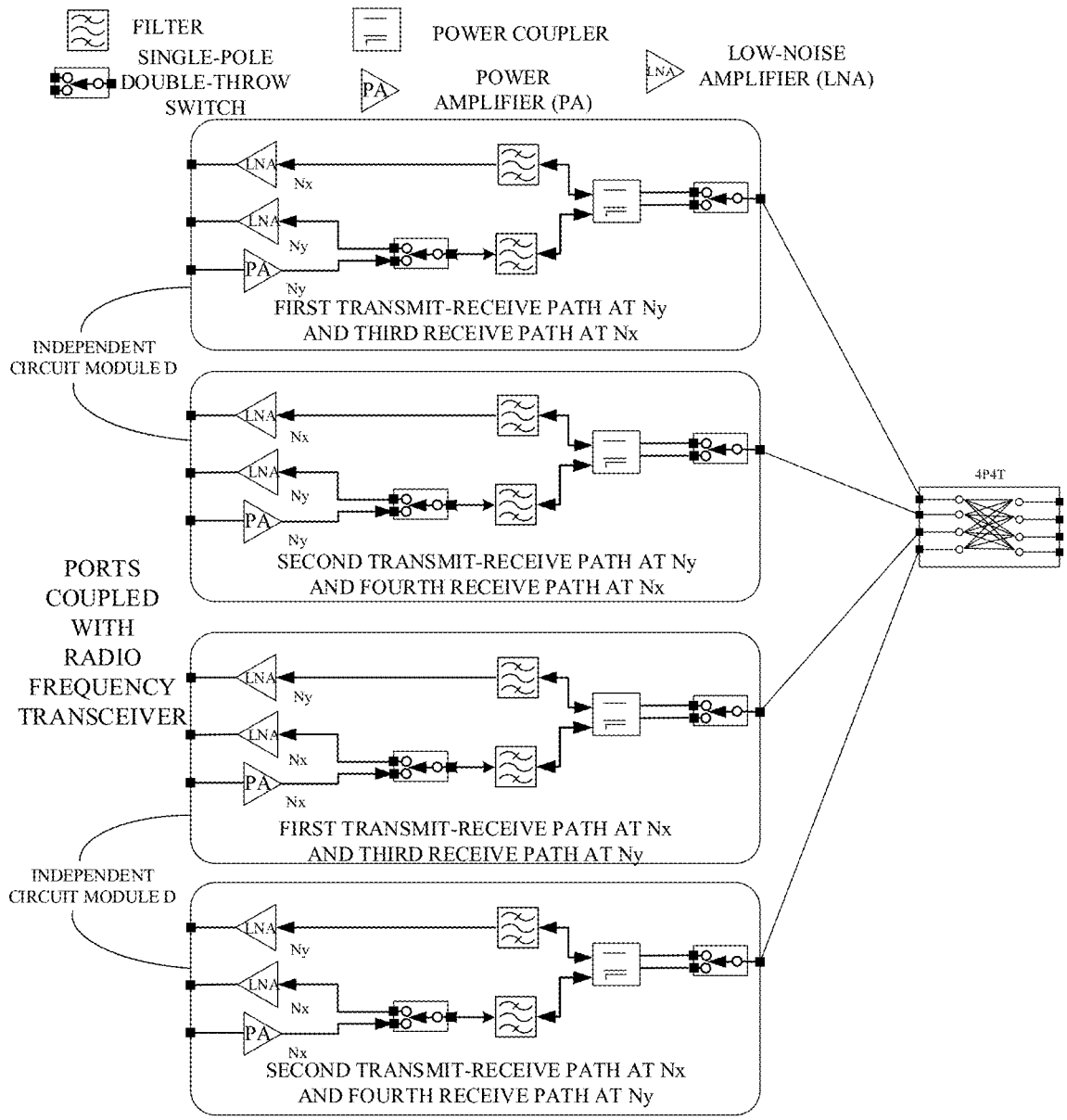
FIG. 4C is a schematic structural diagram illustrating four independent circuit modules corresponding to a fully coupled 4P4T switch according to an implementation of the disclosure.

As illustrated in FIG. 4C, the radio frequency circuit physically includes four independent circuit modules. The four independent circuit modules include four first independent circuit modules, where the first independent circuit module is embodied as independent circuit module D.

The four independent circuit modules have transmit-receive ports coupled in one-to-one correspondence with the four T ports.

The independent circuit module D includes one transceiver integrated circuit, one receiver circuit, one power coupler, and one first selector switch.

Each transceiver integrated circuit includes a first PA, a first filter, a second selector switch, and a first LNA. The second selector switch has a common port coupled with one port of the first filter. The first filter has the other port coupled with one port on one side of the power coupler. The second selector switch has one selection port coupled with the first PA and the other selection port coupled with the first LNA.

Each receiver circuit includes a second LNA and a second filter. The second filter has one port coupled with an input port of the second LNA. The second filter has the other port coupled with the other port on the foregoing one side of the power coupler. The second LNA has an output port configured to output receive signals.

The power coupler has two ports on the other side coupled in one-to-one correspondence with two selection ports of the first selector switch and the first selector switch has a common port coupled with the T port.

Figure 5:
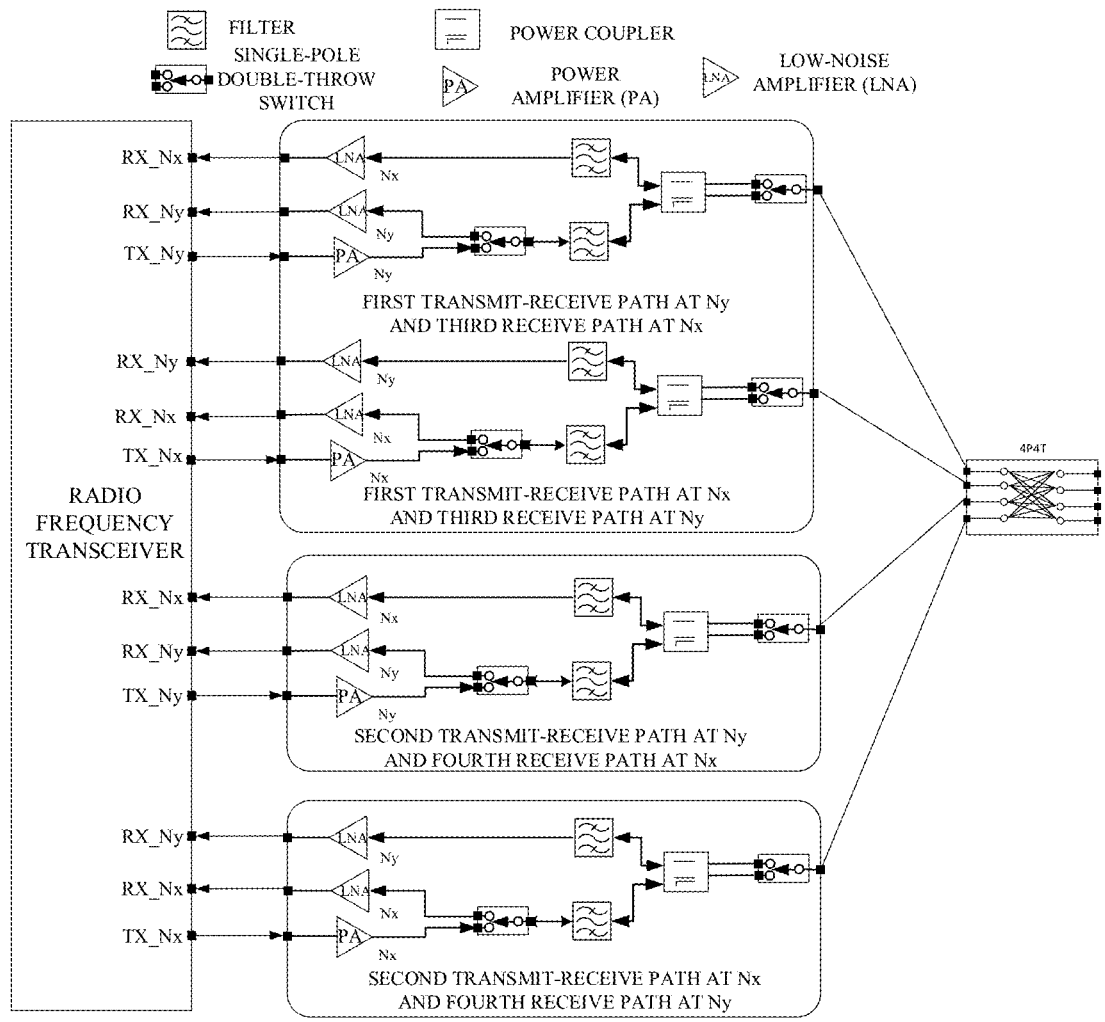
FIG. 5 is a schematic structural diagram illustrating a radio frequency system according to an implementation of the disclosure.

Referring to FIG. 5, the radio frequency system includes three independent circuit modules illustrated in FIG. 4B, the multiway switch described in the above implementations, and a radio frequency transceiver. The three independent circuit modules have transmit-receive ports coupled in one-to-one correspondence with the four T ports. Output ports of the LNAs (including the first LNAs and the second LNAs) and input ports of the first PAs are coupled with corresponding ports of the radio frequency transceiver. It is to be noted that, the radio frequency transceiver is optional.

It can be understood that, the matching manner of the above radio frequency circuit and the multiway switch includes but is not limited to the structure of the drawing, and is merely an example herein.

In addition, the above-mentioned transceiver integrated circuit and receiver circuit can be implemented in various manners. The implementations of the disclosure are not particularly restricted.

In one possible implementation, the four antennas include a first antenna, a second antenna, a third antenna, and a fourth antenna. These four antennas are all operable at a 5G NR frequency band.

In one possible implementation, the four antennas include a first antenna, a second antenna, a third antenna, and a fourth antenna. The first antenna and the fourth antenna are antennas operable at an LTE frequency band and a 5G NR frequency band. The second antenna and the third antenna are antennas only operable at the 5G NR frequency band.

The first antenna and fourth antenna are intended to support DL 4×4 MIMO at some frequency bands in LTE on terminals. These two antennas are shared with the 5G NR (hereinafter, "shared antennas" for short).

Figure 6:
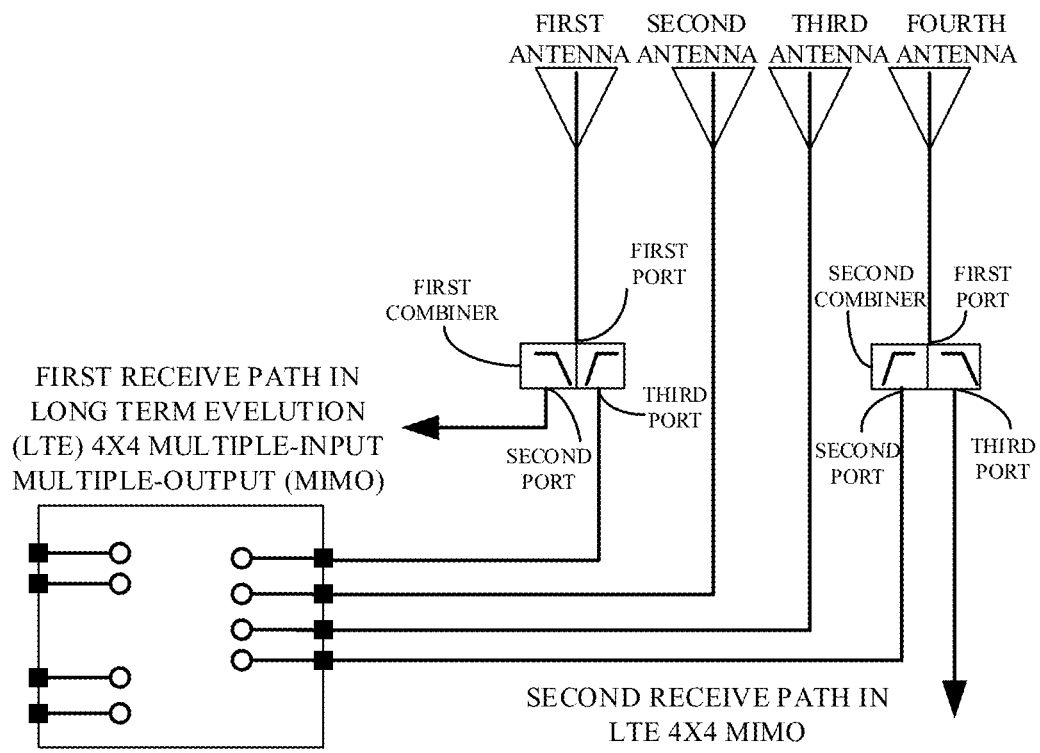
FIG. 6 is a schematic structural diagram illustrating an antenna system of a wireless communication device according to an implementation of the disclosure.

In one possible implementation, as illustrated in FIG. 6, the antenna system further includes a first combiner and a second combiner. The first combiner has a first port configured to be coupled with the first antenna, a second port configured to be coupled with a first receive path in LTE 4×4 MIMO configuration of the wireless communication device, and a third port configured to be coupled with a corresponding P port of the multiway switch. The second combiner has a first port configured to be coupled with the fourth antenna, a second port configured to be coupled with a second receive path in the LTE 4×4 MIMO configuration of the wireless communication device, and a third port configured to be coupled with a corresponding P port of the multiway switch.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the wireless communication device will arrange one antenna with better performance for the circuit for PRX (primary receiver), and the antenna will be in a standby state. Moreover, T ports in the switch having both the transmission function and the reception function can be configured for TX (transmit) and PRX purpose, and thus the antenna can be switched arbitrarily. In this way, there is no need to restrict the coupling between ports of shared antennas.

Figure 7:
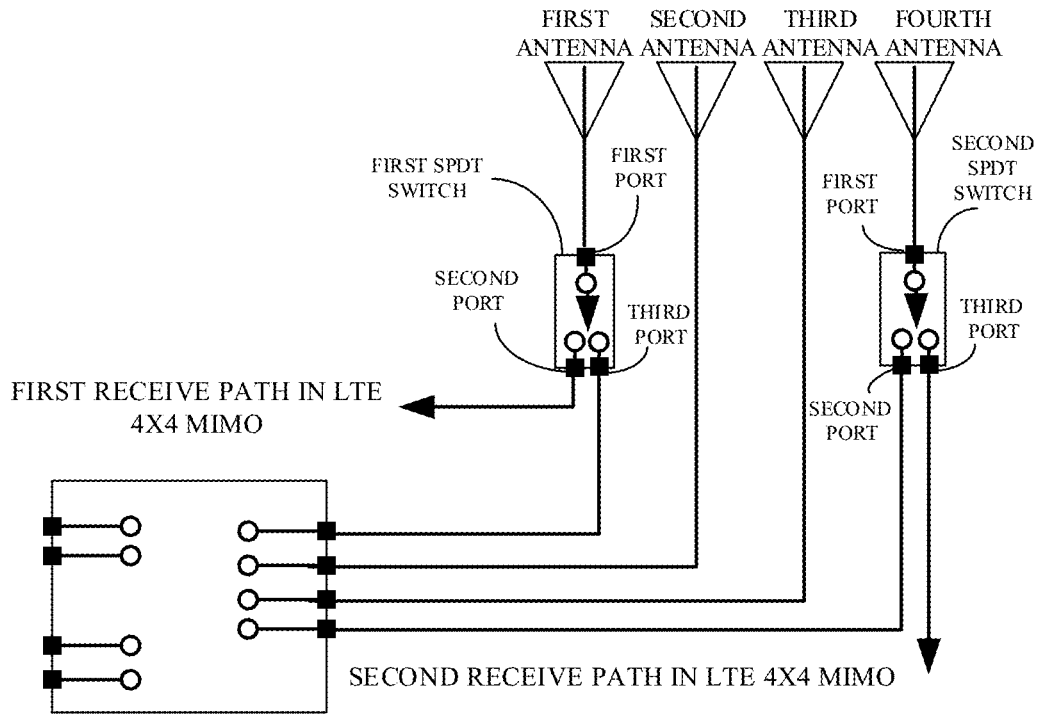
FIG. 7 is a schematic structural diagram illustrating another antenna system of a wireless communication device according to an implementation of the disclosure.

In one possible implementation, as illustrated in FIG. 7, the antenna system further includes a SPDT switch and a second SPDT switch. The first SPDT switch has a first port configured to be coupled with the first antenna, a second port configured to be coupled with a first receive path in LTE 4×4 MIMO configuration of the wireless communication device, and a third port configured to be coupled with a corresponding P port of the multiway switch. The second SPDT switch has a first port configured to be coupled with the fourth antenna, a second port configured to be coupled with a second receive path in the LTE 4×4 MIMO configuration of the wireless communication device, and a third port configured to be coupled with a corresponding P port of the multiway switch.

The schemes of the disclosure can be combined or replaced with each other. For example, the antenna system and/or the multiway switch described above can be applied or combined into the radio frequency system and the terminal device below. It is to be noted that, "the antenna system and/or the multiway switch" of the disclosure means "the antenna system", "the multiway switch", or "the antenna system and the multiway switch".

Figure 8:
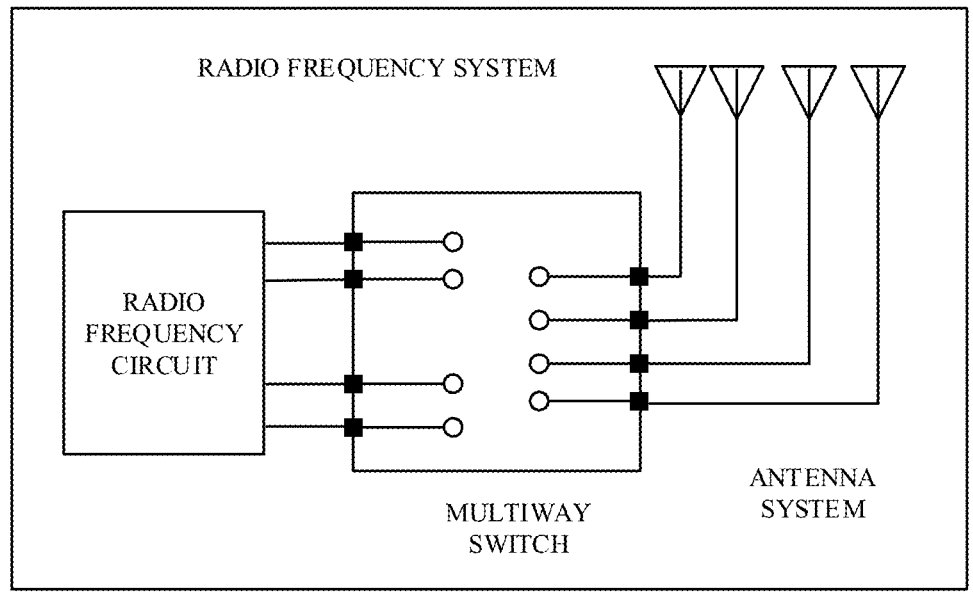
FIG. 8 is a schematic structural diagram illustrating a radio frequency system according to an implementation of the disclosure.

FIG. 8 is a schematic structural diagram illustrating a radio frequency system according to an implementation of the disclosure. The radio frequency system includes an antenna system, a radio frequency circuit, and a multiway switch coupled with the radio frequency circuit and the antenna system. The multiway switch includes four T ports and four P ports. Each of the four T ports is coupled with all of the four P ports. The four T ports support a transmission-reception function. The antenna system includes four antennas corresponding to the four P ports. The multiway switch is configured to implement a preset function of transmitting an SRS through the four antennas in turn.

As one implementation, each P port is coupled with one antenna of the four antennas. Any two P ports of the four P ports are coupled with different antennas of the four antennas As one implementation, the four antennas include a first antenna, a second antenna, a third antenna, and a fourth antenna. The first antenna, the second antenna, the third antenna, and the fourth antenna are antennas operable at a 5G NR frequency band.

As one implementation, the four antennas include a first antenna, a second antenna, a third antenna, and a fourth antenna. The first antenna and the fourth antenna are antennas operable at an LTE frequency band and a 5G NR frequency band. The second antenna and the third antenna are antennas only operable at the 5G NR frequency band.

As one implementation, the antenna system further includes a first combiner and a second combiner. The first combiner has a first port coupled with the first antenna, a second port coupled with a first receive path in LTE 4×4 MIMO configuration of the radio frequency system, and a third port coupled with a corresponding P port of the multiway switch. The second combiner has a first port coupled with the fourth antenna, a second port coupled with a second receive path in the LTE 4×4 MIMO configuration of the wireless communication device, and a third port coupled with a corresponding P port of the multiway switch.

As one implementation, the antenna system further includes a SPDT switch and a second SPDT switch. The first SPDT switch has a first port coupled with the first antenna, a second port coupled with a first receive path in LTE 4×4 MIMO configuration of the radio frequency system, and a third port coupled with a corresponding P port of the multiway switch. The second SPDT switch has a first port coupled with the fourth antenna, a second port coupled with a second receive path in the LTE 4×4 MIMO configuration of the wireless communication device, and a third port coupled with a corresponding P port of the multiway switch.

The definitions related to the radio frequency system illustrated in FIG. 8 are similar to the foregoing descriptions and are not described herein.

Figure 9:
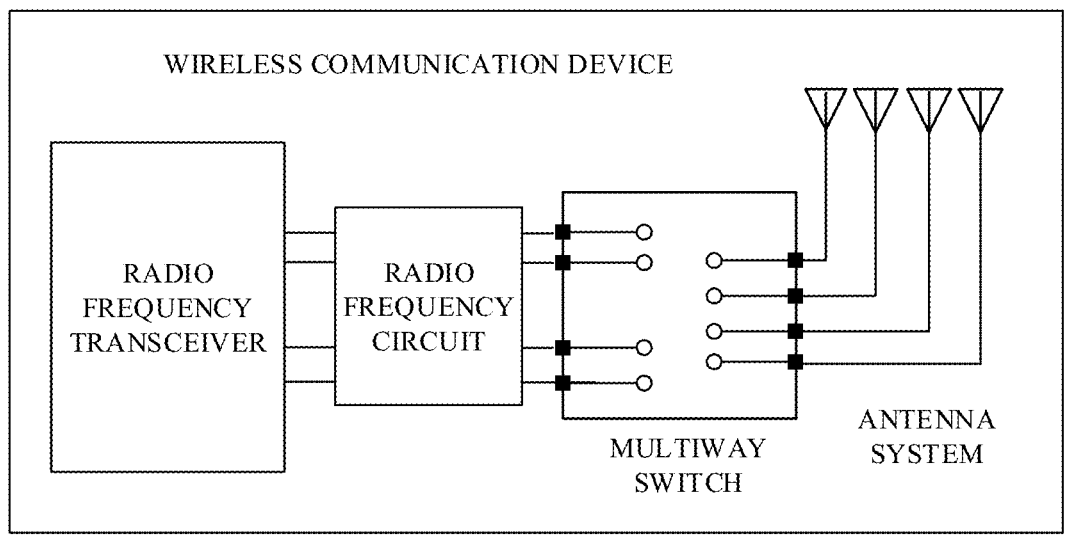
FIG. 9 is a schematic structural diagram illustrating a wireless communication device according to an implementation of the disclosure.

FIG. 9 is a schematic structural diagram illustrating a wireless communication device according to an implementation of the disclosure. The wireless communication device for example can be a terminal device, a base station, and the like and includes an antenna system, a radio frequency transceiver, a radio frequency circuit coupled with the radio frequency transceiver, and the multiway switch described in any of the implementations above.

The multiway switch includes four T ports and four P ports. The antenna system includes four antennas corresponding to the four P ports. Each of the four T ports is coupled with all of the four P ports and the four T ports support a transmission-reception function. Each P port is coupled with one antenna of the four antennas and any two P ports of the four P ports are coupled with different antennas of the four antennas.

The multiway switch is coupled with the radio frequency circuit and the antenna system and configured to support a preset function of transmitting an SRS through the four antennas in turn.

Figure 10:
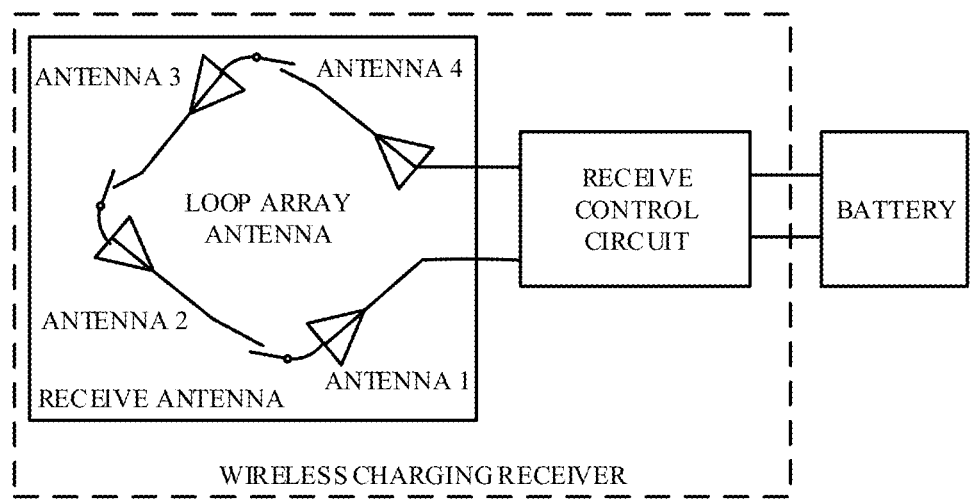
FIG. 10 is a schematic diagram illustrating a wireless charging receiver for multiplexing an antenna of a wireless communication device according to an implementation of the disclosure.

In addition, as illustrated in FIG. 10, the four antennas in the antenna system described in the implementations of the disclosure can also be multiplexed by a wireless charging receiver of the wireless communication device (such as a mobile phone). The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna include at least one of the four antennas (in the case of multiple antennas, the multiple antennas are strobed via switches).

Figure 11:
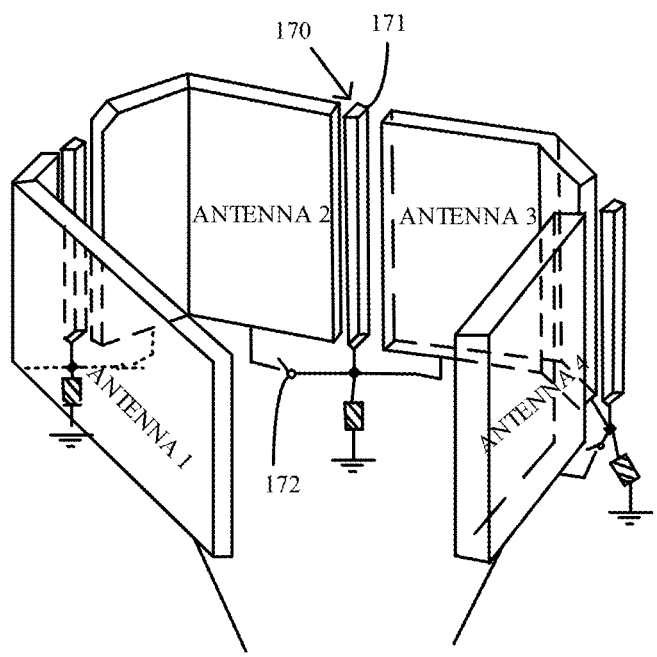
FIG. 11 is a schematic structural diagram illustrating a loop array antenna including four antennas according to an implementation of the disclosure.

For example, as illustrated in FIG. 11, the receive antenna is a loop array antenna including the four antennas described above. The four antennas include antenna 1, antenna 2, antenna 3, and antenna 4. Antenna 1 and antenna 4 are operable at both an LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The wireless communication device can conduct the switch 172 of each gate circuit 170 in a wireless charging mode to form a loop array antenna to receive energy. By adding the spacers 171 among the antennas, the gate circuit 170 can reduce mutual coupling among the multiple antennas of the wireless communication device in a normal communication mode, improve isolation among the multiple antennas, and optimize performance of the antennas. On the other hand, the multiple antennas can be coupled in series to form the loop array antenna through the switches 172, so as to better match the transmit antennas to transfer energy. Furthermore, since the capabilities of antenna 1 and antenna 4 are stronger than those of antenna 2 and antenna 3, the loop array antenna thus arranged can reduce energy loss in transmission as much as possible.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch, comprising:
   four T ports and $2^n$ P ports, each of the four T ports being coupled with all of the $2^n$ P ports, the four T ports supporting a transmission-reception function; n being an integer and n≥2; and
   the multiway switch being configured to be coupled with a radio frequency circuit and an antenna system of a wireless communication device operable in a dual-frequency dual-transmit mode to implement a preset function of the wireless communication device, the antenna system comprising $2^n$ antennas corresponding to the $2^n$ P ports, and the preset function being a function of transmitting a sounding reference signal (SRS) through the $2^n$ antennas in turn;
   wherein each P port of the $2^n$ P ports is configured to be coupled with a corresponding antenna of the $2^n$ antennas.

2. The multiway switch of claim 1, wherein
   the radio frequency circuit logically comprises four transceiver integrated circuits and ($2^{n+1}-4$) receiver circuits; and
   the radio frequency circuit physically comprises m independent circuit modules, wherein m is an integer and m≥2.

3. The multiway switch of claim 1, wherein n=2, the multiway switch comprises field-effect transistors (FET), and 56 FETs are configured in the multiway switch.

4. The multiway switch of claim 1, wherein
   n=2, and the $2^n$ antennas comprise a first antenna, a second antenna, a third antenna, and a fourth antenna; and
   the first antenna, the second antenna, the third antenna, and the fourth antenna are antennas operable at a fifth generation new radio (5G NR) frequency band.

5. The multiway switch of claim 1, wherein
   n=2, and the $2^n$ antennas comprise a first antenna, a second antenna, a third antenna, and a fourth antenna;
   the first antenna and the fourth antenna are antennas operable at a long term evolution (LTE) frequency band and a 5G NR frequency band; and
   the second antenna and the third antenna are antennas only operable at the 5G NR frequency band.

6. The multiway switch of claim 2, wherein
   n=2, and the radio frequency circuit logically comprises four transceiver integrated circuits and four receiver circuits;
   m=2, and the radio frequency circuit physically comprises two independent circuit modules; and
   the two independent circuit modules have transmit-receive ports configured to be coupled in one-to-one correspondence with the four T ports.

7. The multiway switch of claim 2, wherein
   n=2, and the radio frequency circuit logically comprises four transceiver integrated circuits and four receiver circuits;
   m=3, and the radio frequency circuit physically comprises three independent circuit modules;
   the three independent circuit modules comprise two first independent circuit modules and one second independent circuit module; and
   the three independent circuit modules have transmit-receive ports configured to be coupled in one-to-one correspondence with the four T ports.

8. The multiway switch of claim 2, wherein
   n=2, and the radio frequency circuit logically comprises four transceiver integrated circuits and four receiver circuits;
   m=4, and the radio frequency circuit physically comprises four independent circuit modules;
   the four independent circuit modules comprise four first independent circuit modules; and
   the four independent circuit modules have transmit-receive ports configured to be coupled in one-to-one correspondence with the four T ports.

9. The multiway switch of claim 5, wherein the antenna system further comprises a first combiner and a second combiner, wherein
   the first combiner has a first port configured to be coupled with the first antenna, a second port configured to be coupled with a first receive path in LTE 4×4 multiple-input multiple-output (MIMO) configuration of the wireless communication device, and a third port configured to be coupled with a corresponding P port of the multiway switch; and
   the second combiner has a first port configured to be coupled with the fourth antenna, a second port configured to be coupled with a second receive path in the LTE 4×4 MIMO configuration of the wireless communication device, and a third port configured to be coupled with a corresponding P port of the multiway switch.

10. The multiway switch of claim 5, wherein the antenna system further comprises a first single-pole double-throw (SPDT) switch and a second SPDT switch, wherein
   the first SPDT switch has a first port configured to be coupled with the first antenna, a second port configured to be coupled with a first receive path in LTE 4×4 MIMO configuration of the wireless communication device, and a third port configured to be coupled with a corresponding P port of the multiway switch; and the second SPDT switch has a first port configured to be coupled with the fourth antenna, a second port configured to be coupled with a second receive path in the LTE 4×4 MIMO configuration of the wireless communication device, and a third port configured to be coupled with a corresponding P port of the multiway switch.

11. The multiway switch of claim 6, wherein
the two independent circuit modules comprise two first independent circuit modules, the first independent circuit module comprises two transmit-receive ports, and the transmit-receive ports are configured to be coupled with the T ports;
the first independent circuit module comprises two transceiver integrated circuits working at different frequency bands, two receiver circuits, two power couplers, and two first selector switches;
each transceiver integrated circuit comprises a first power amplifier (PA), a first filter, a second selector switch, and a first low-noise amplifier (LNA), wherein
the second selector switch has a common port coupled with one port of the first filter;
the first filter has the other port coupled with one port on one side of the power coupler; and
the second selector switch has one selection port coupled with the first PA and the other selection port coupled with the first LNA; and
each receiver circuit comprises a second LNA and a second filter, wherein
the second filter has one port coupled with an input port of the second LNA;
the second filter has the other port coupled with the other port on the one side of the power coupler;
the second LNA has an output port configured to output receive signals; and
the power coupler has two ports on the other side coupled in one-to-one correspondence with two selection ports of the first selector switch, and the first selector switch has a common port configured to be coupled with the T port.

12. The multiway switch of claim 7, wherein
the first independent circuit module comprises one transceiver integrated circuit, one receiver circuit, one power coupler, and one first selector switch;
the second independent circuit module comprises two transceiver integrated circuits working at different frequency bands, two receiver circuits, two power couplers, and two first selector switches;
each transceiver integrated circuit comprises a first PA, a first filter, a second selector switch, and a first LNA, wherein
the second selector switch has a common port coupled with one port of the first filter;
the first filter has the other port coupled with one port on one side of the power coupler; and
the second selector switch has one selection port coupled with the first PA and the other selection port coupled with the first LNA;
each receiver circuit comprises a second LNA and a second filter, wherein
the second filter has one port coupled with an input port of the second LNA;
the second filter has the other port coupled with the other port on the one side of the power coupler; and
the second LNA has an output port configured to output receive signals; and
the power coupler has two ports on the other side coupled in one-to-one correspondence with two selection ports of the first selector switch, and the first selector switch has a common port configured to be coupled with the T port.

13. The multiway switch of claim 8, wherein
the first independent circuit module comprises one transceiver integrated circuit, one receiver circuit, one power coupler, and one first selector switch;
each transceiver integrated circuit comprises a first PA, a first filter, a second selector switch, and a first LNA, wherein
the second selector switch has a common port coupled with one port of the first filter;
the first filter has the other port coupled with one port on one side of the power coupler; and
the second selector switch has one selection port coupled with the first PA and the other selection port coupled with the first LNA; and
each receiver circuit comprises a second LNA and a second filter, wherein
the second filter has one port coupled with an input port of the second LNA;
the second filter has the other port coupled with the other port on the one side of the power coupler;
the second LNA has an output port configured to output receive signals; and
the power coupler has two ports on the other side coupled in one-to-one correspondence with two selection ports of the first selector switch, and the first selector switch has a common port configured to be coupled with the T port.

14. A radio frequency system, comprising an antenna system, a radio frequency circuit, and a multiway switch coupled with the radio frequency circuit and the antenna system;
the multiway switch comprising four T ports and $2^n$ P ports; each of the four T ports being coupled with all of the $2^n$ P ports; the four T ports supporting a transmission-reception function; n being an integer and n≥2;
the antenna system comprising $2^n$ antennas corresponding to the $2^n$ P ports; and
the multiway switch being configured to implement a preset function of transmitting an SRS through the $2^n$ antennas in turn;
wherein each P port is coupled with one antenna of $2^n$ antennas.

15. The radio frequency system of claim 14, wherein any two P ports of the $2^n$ P ports are coupled with different antennas of the $2^n$ antennas.

16. The radio frequency system of claim 14, wherein n=2, and the $2^n$ antennas comprise a first antenna, a second antenna, a third antenna, and a fourth antenna; and
the first antenna, the second antenna, the third antenna, and the fourth antenna are antennas operable at a 5G NR frequency band.

17. The radio frequency system of claim 14, wherein n=2, and the $2^n$ antennas comprise a first antenna, a second antenna, a third antenna, and a fourth antenna;
the first antenna and the fourth antenna are antennas operable at an LTE frequency band and a 5G NR frequency band; and
the second antenna and the third antenna are antennas only operable at the 5G NR frequency band.

18. The radio frequency system of claim 17, wherein the antenna system further comprises a first combiner and a second combiner, wherein the first combiner has a first port coupled with the first antenna, a second port coupled with a first receive path in LTE 4×4 MIMO configuration of the radio frequency system, and a third port coupled with a corresponding P port of the multiway switch; and the second combiner has a first port coupled with the fourth antenna, a second port coupled with a second receive path in the LTE 4×4 MIMO configuration of the wireless communication device, and a third port coupled with a corresponding P port of the multiway switch.

19. The radio frequency system of claim 17, wherein the antenna system further comprises a first SPDT switch and a second SPDT switch, wherein the first SPDT switch has a first port coupled with the first antenna, a second port coupled with a first receive path in LTE 4×4 MIMO configuration of the radio frequency system, and a third port coupled with a corresponding P port of the multiway switch; and the second SPDT switch has a first port coupled with the fourth antenna, a second port coupled with a second receive path in the LTE 4×4 MIMO configuration of the wireless communication device, and a third port coupled with a corresponding P port of the multiway switch.

20. A wireless communication device, comprising an antenna system, a radio frequency transceiver, a radio frequency circuit coupled with the radio frequency transceiver, and a multiway switch coupled with the radio frequency circuit and the antenna system;

the multiway switch comprising four T ports and $2^n$ P ports, and the antenna system comprising $2^n$ antennas corresponding to the $2^n$ P ports; n being an integer and n≥2;

each of the four T ports being coupled with all of the $2^n$ P ports and the four T ports supporting a transmission-reception function;

each P port being coupled with one antenna of the $2^n$ antennas and any two P ports of the $2^n$ P ports being coupled with different antennas of the $2^n$ antennas; and the multiway switch being configured to support a preset function of transmitting an SRS through the $2^n$ antennas in turn.

* * * * *